Figure 6:
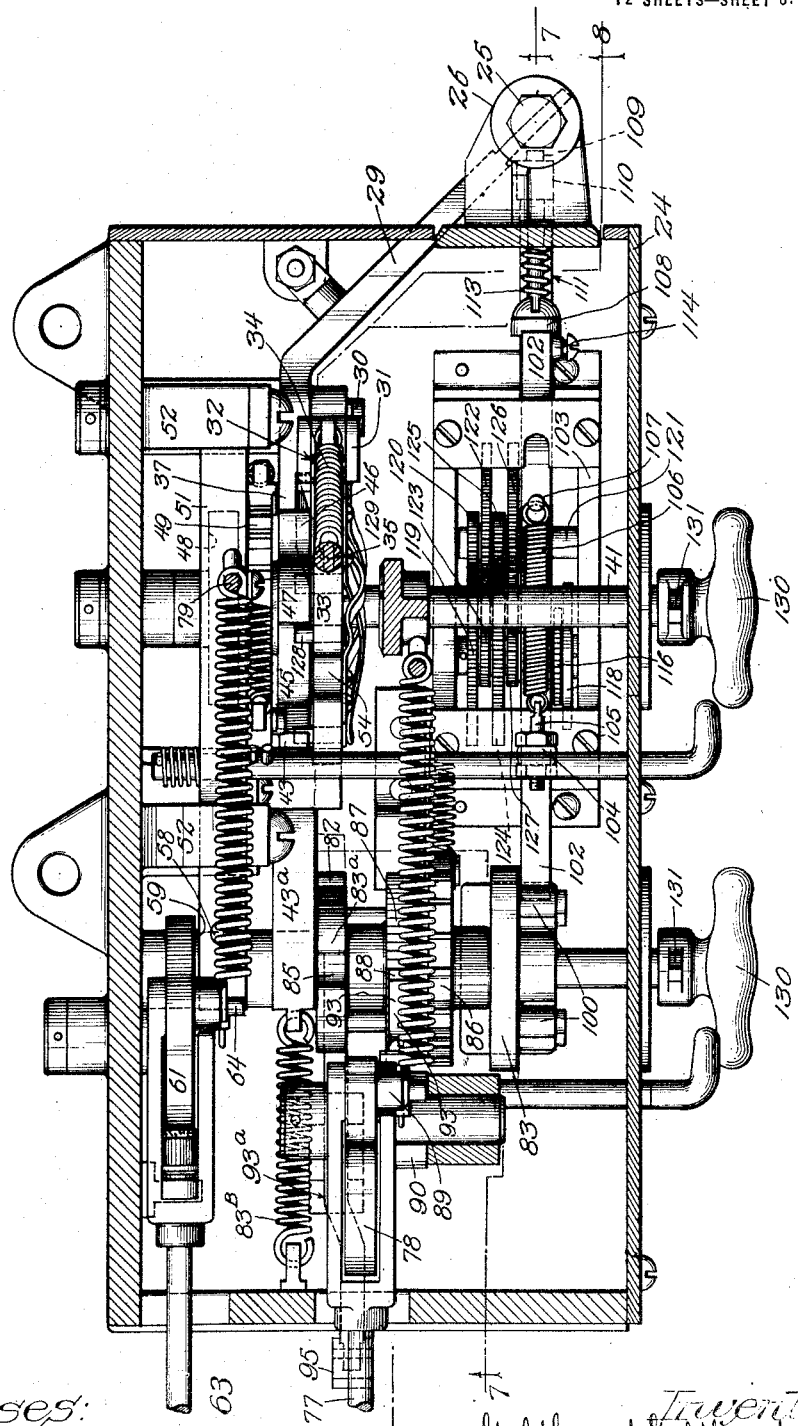

G. GULDBRANDSEN.
WEIGHING AND RECORDING SCALE.
APPLICATION FILED NOV. 17, 1916.
1,369,238. Patented Feb. 22, 1921.
12 SHEETS—SHEET 1.
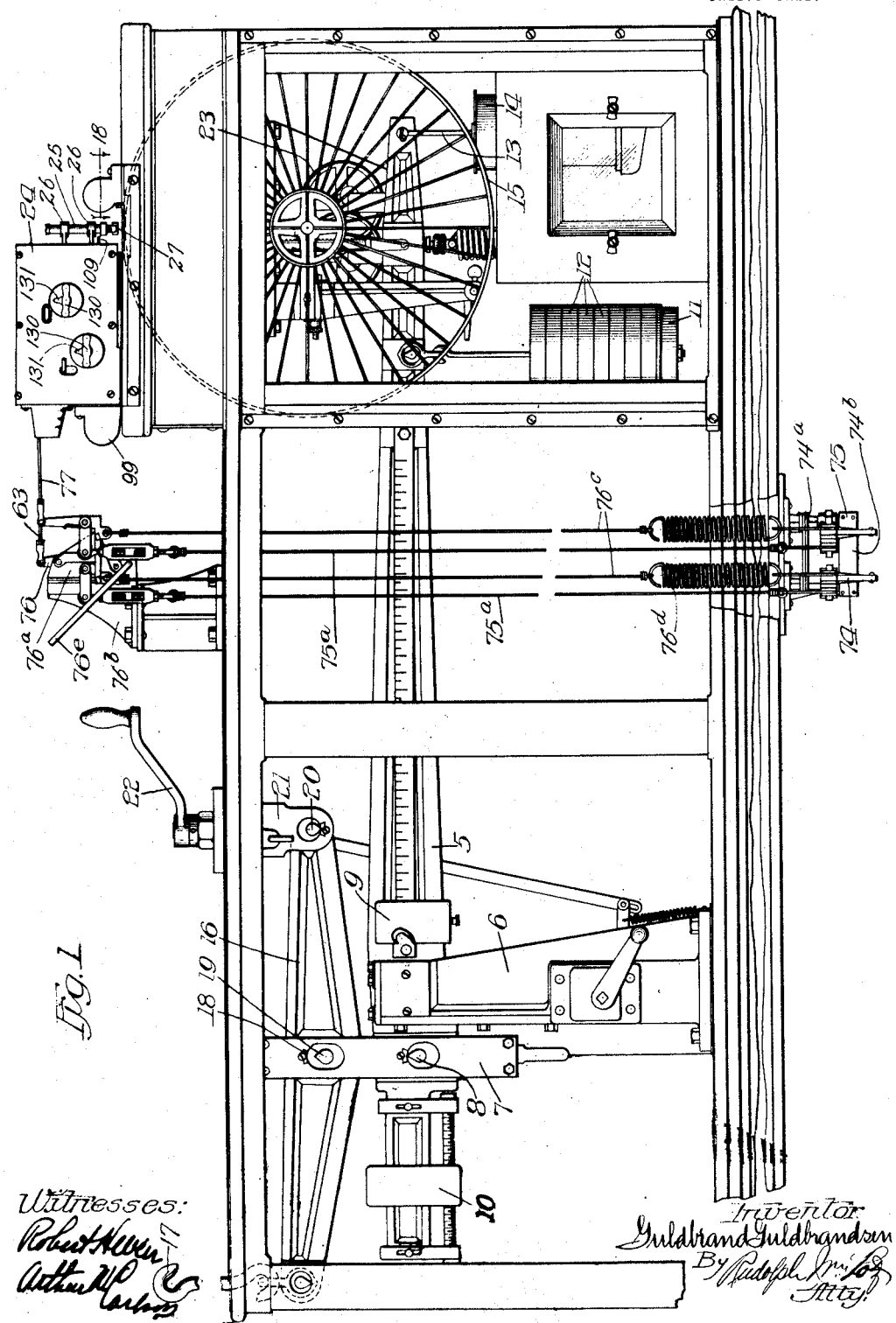

G. GULDBRANDSEN.
WEIGHING AND RECORDING SCALE.
APPLICATION FILED NOV. 17, 1916.
1,369,238.  Patented Feb. 22, 1921.
12 SHEETS—SHEET 2.
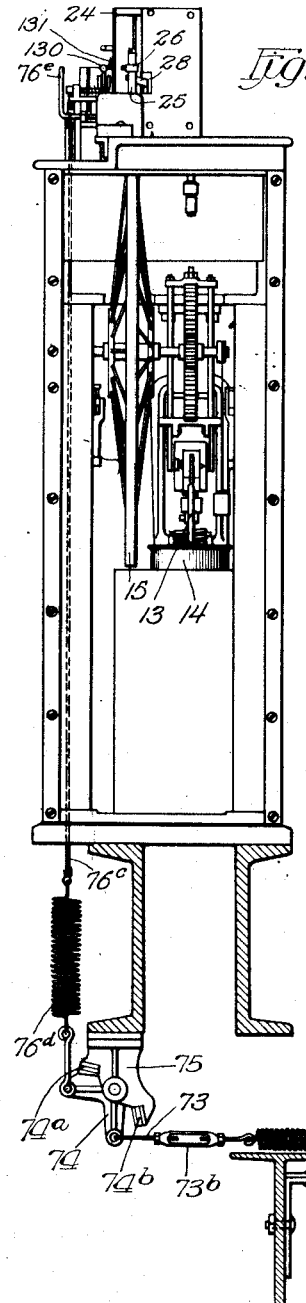
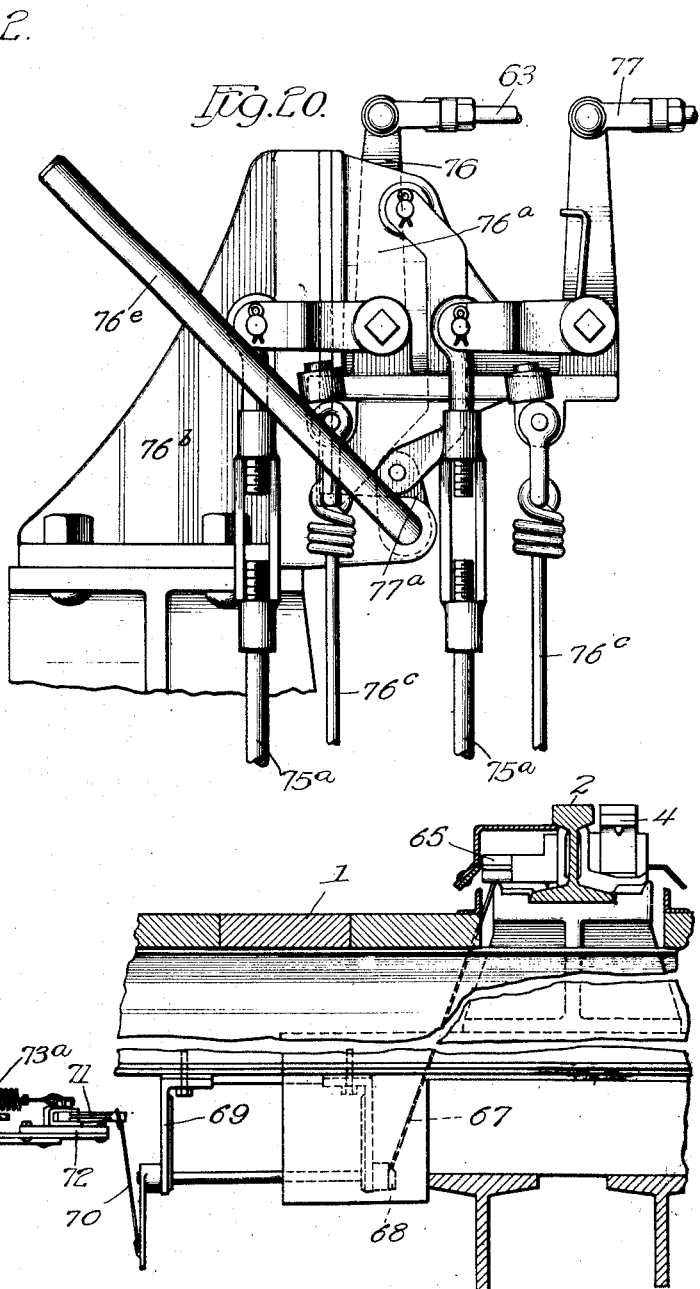

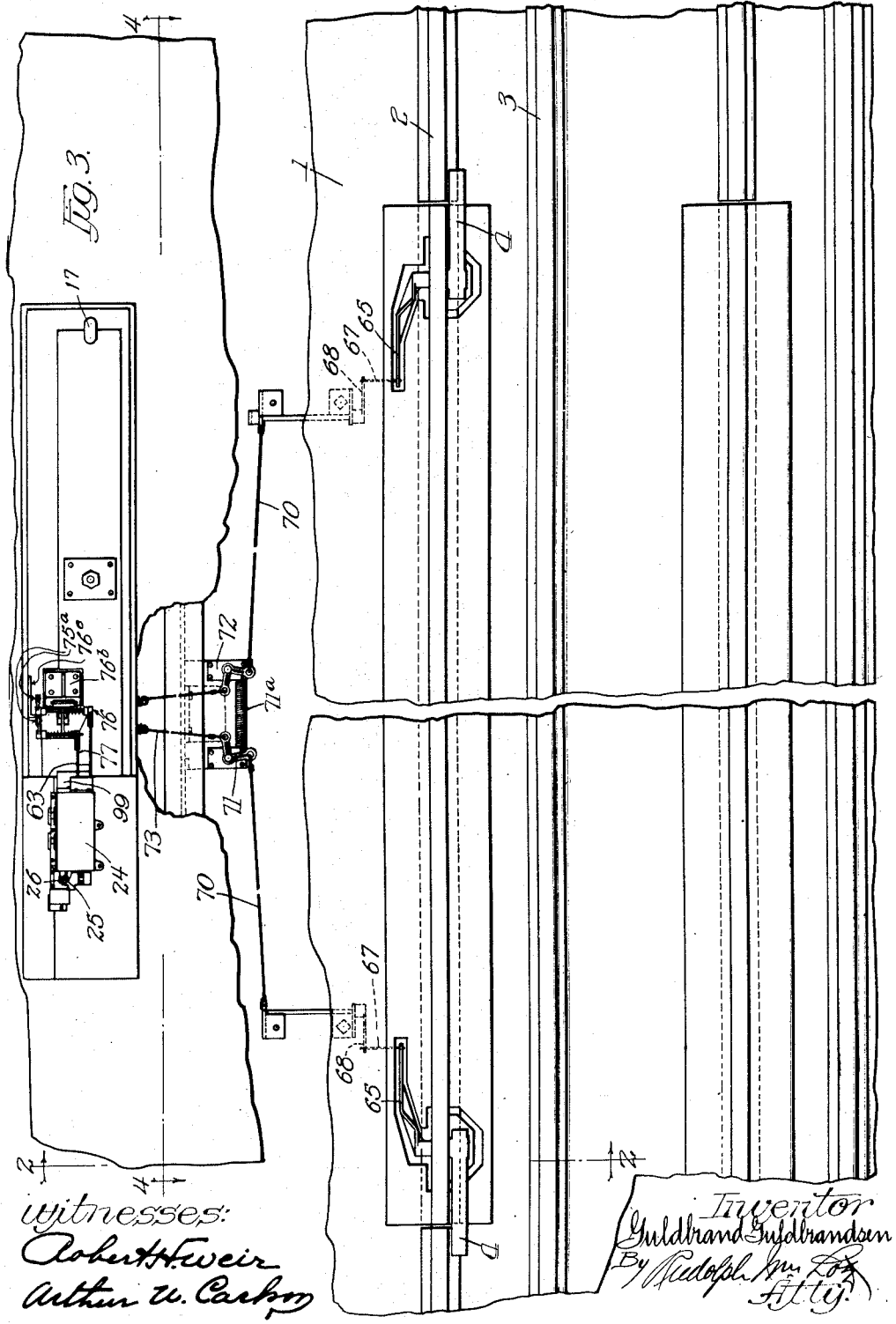

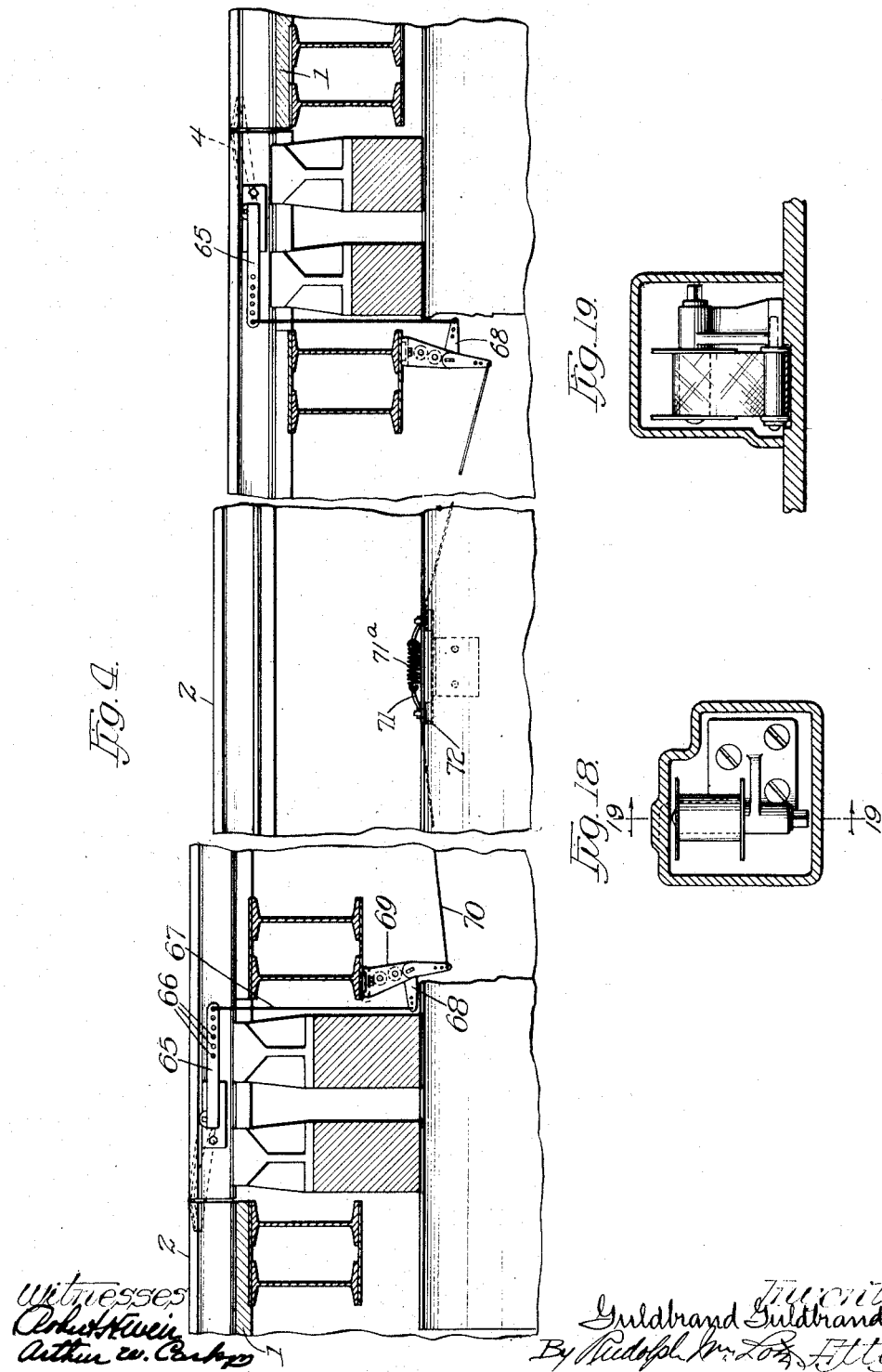

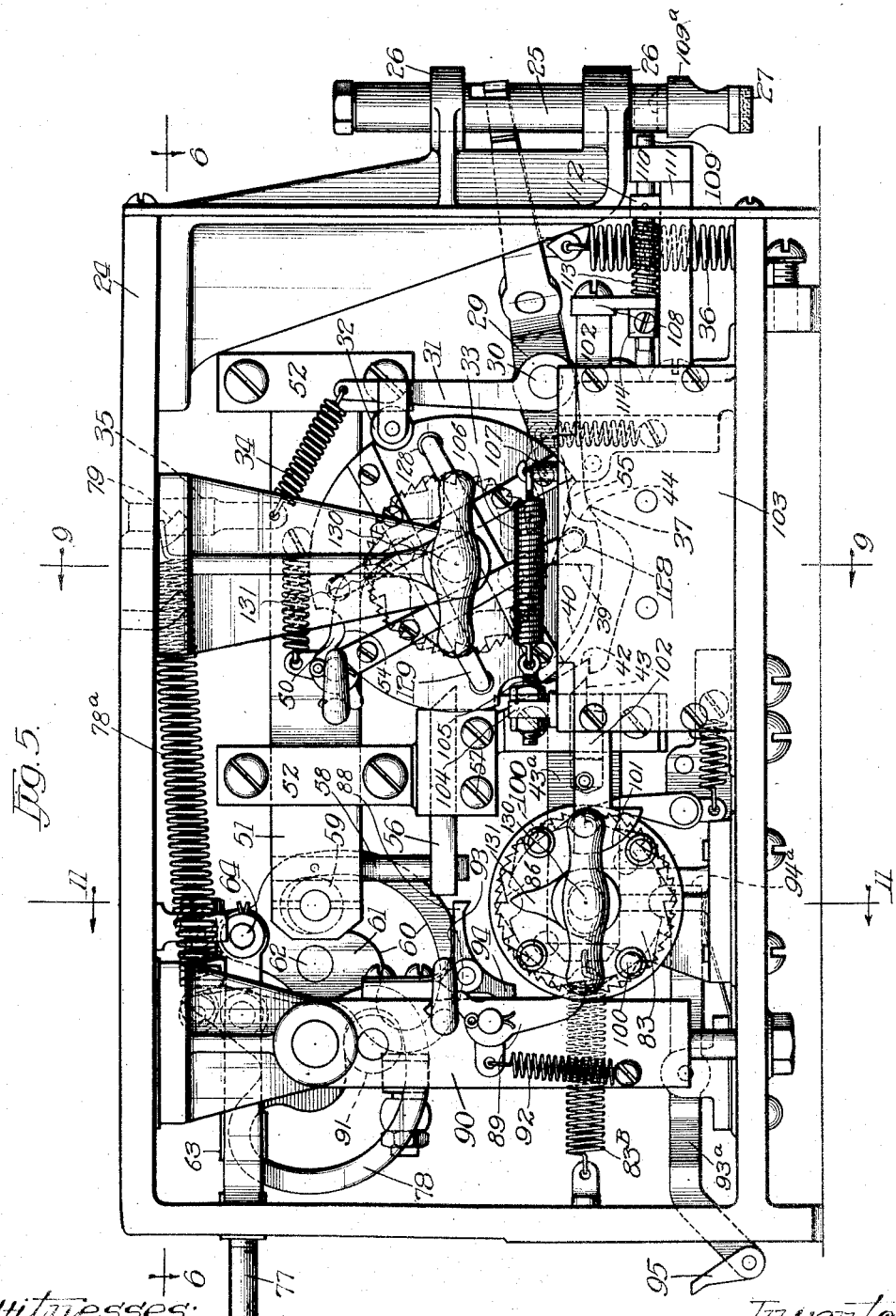

G. GULDBRANDSEN.
WEIGHING AND RECORDING SCALE.
APPLICATION FILED NOV. 17, 1916.

1,369,238.

Patented Feb. 22, 1921.
12 SHEETS—SHEET 7.

G. GULDBRANDSEN.
WEIGHING AND RECORDING SCALE.
APPLICATION FILED NOV. 17, 1916.

1,369,238.

Patented Feb. 22, 1921.
12 SHEETS—SHEET 9.

G. GULDBRANDSEN.
WEIGHING AND RECORDING SCALE.
APPLICATION FILED NOV. 17, 1916.
1,369,238.
Patented Feb. 22, 1921.
12 SHEETS—SHEET 10.
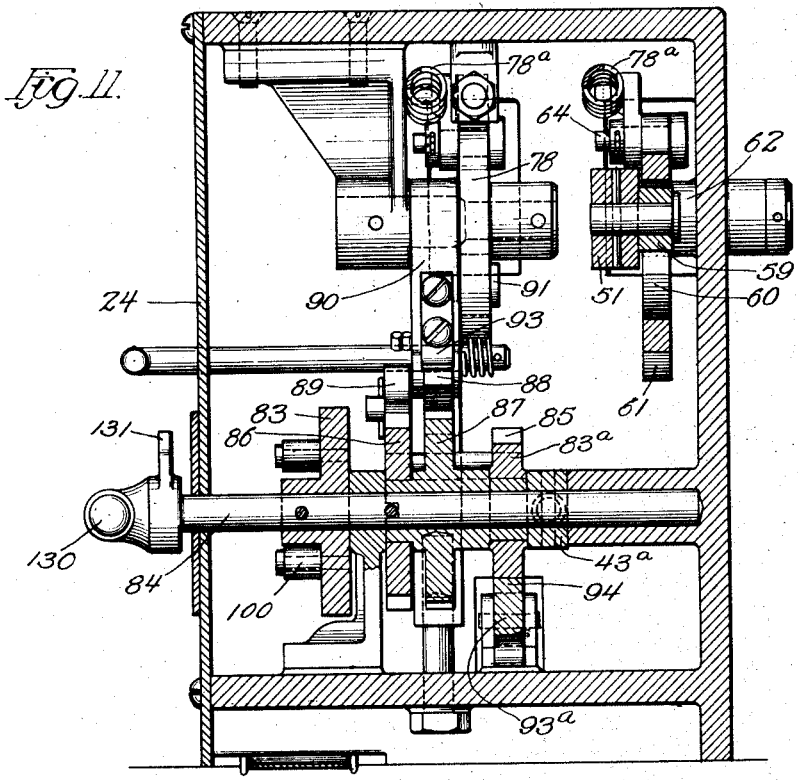
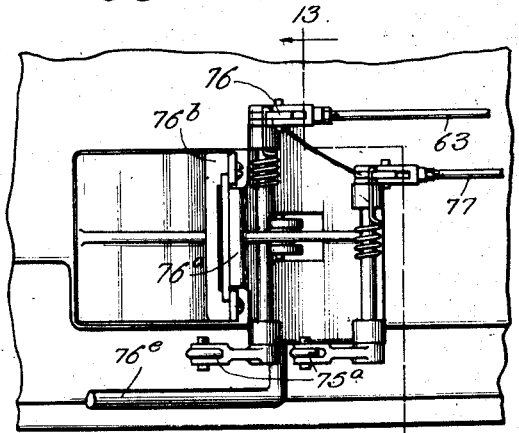
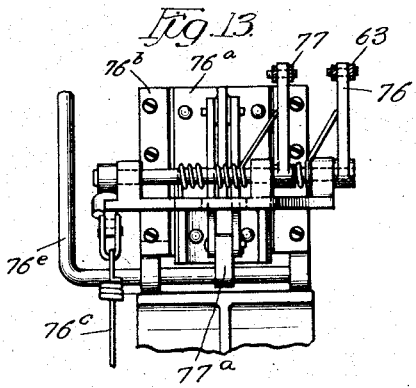
Witnesses:
Inventor:
Guldbrand Guldbrandsen
By Rudolph M. Lotz Atty.

G. GULDBRANDSEN.
WEIGHING AND RECORDING SCALE.
APPLICATION FILED NOV. 17, 1916.
1,369,238.
Patented Feb. 22, 1921.
12 SHEETS—SHEET 11.
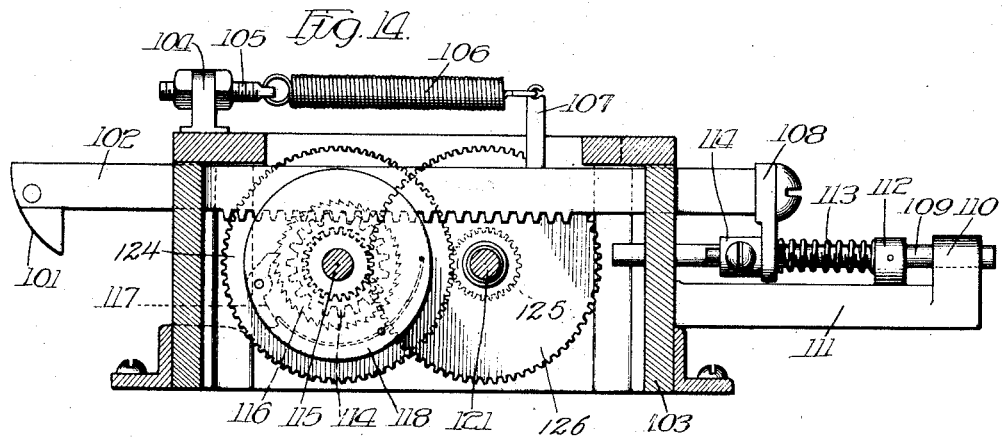
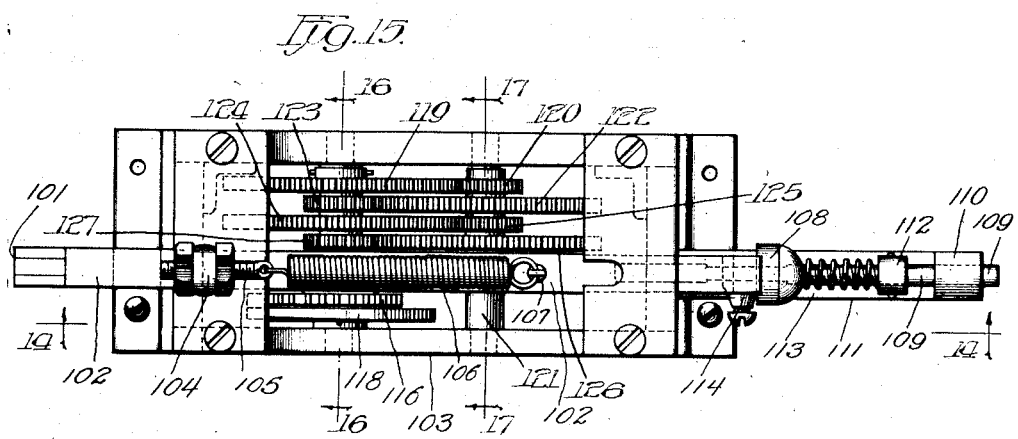
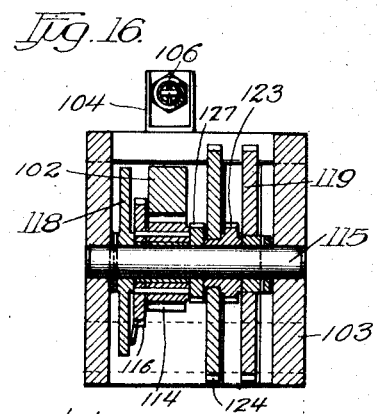
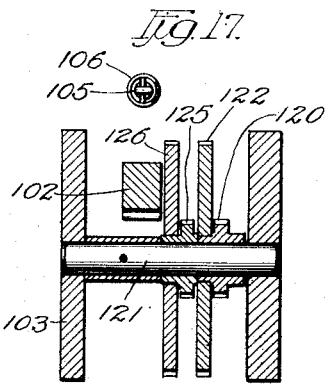

G. GULDBRANDSEN.
WEIGHING AND RECORDING SCALE.
APPLICATION FILED NOV. 17, 1916.
1,369,238. Patented Feb. 22, 1921.
12 SHEETS—SHEET 12.
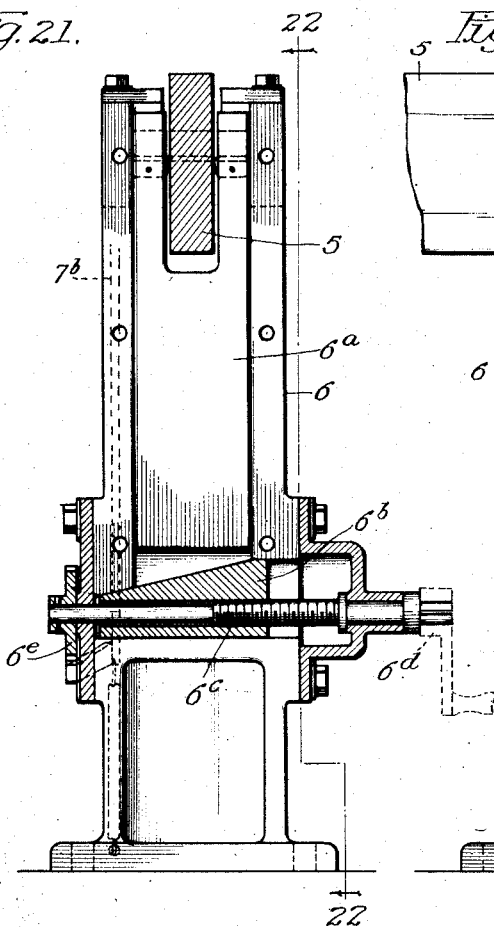
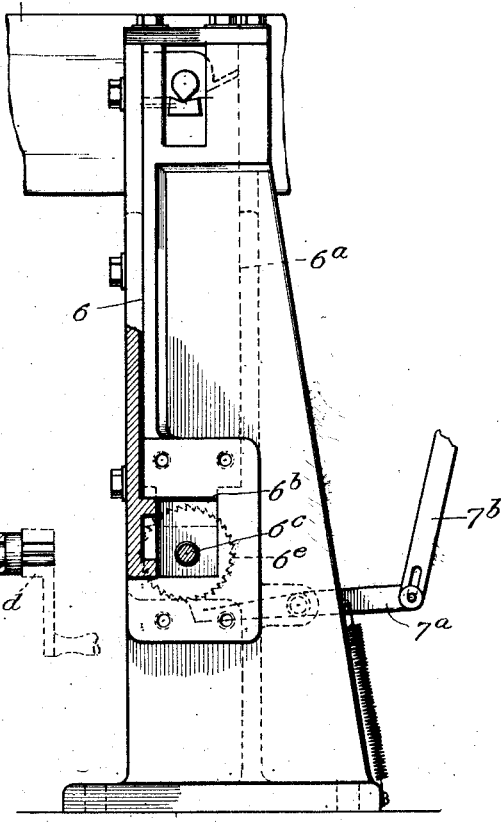
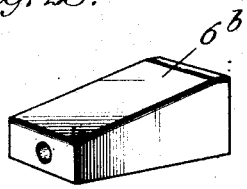

UNITED STATES PATENT OFFICE.

GULDBRAND GULDBRANDSEN, OF CHICAGO, ILLINOIS, ASSIGNOR TO STREETER AMET WEIGHING & RECORDING COMPANY, OF CHICAGO, ILLINOIS, A CORPORATION OF ILLINOIS.

WEIGHING AND RECORDING SCALE.

1,369,238.   Specification of Letters Patent.   Patented Feb. 22, 1921.

Application filed November 17, 1916. Serial No. 131,970.

*To all whom it may concern:*

Be it known that I, GULDBRAND GULDBRANDSEN, subject of the King of Denmark, residing at Chicago, in the county of Cook and State of Illinois, have invented certain new and useful Improvements in Weighing and Recording Scales; and I do hereby declare the following to be a full, clear, and exact description of the invention, such as will enable others skilled in the art to which it appertains to make and use the same.

This invention relates to improvements in weigh scales and more particularly to so-called track scales of the type used by railroads for weighing cars.

The particular type of track scales to which the invention relates is the automatic type in which cars are weighed during travel over the scale platform whereby the weight of a car is obtained and recorded while the care is in motion.

One object of my present invention is to provide a weighing scale for railroad cars and the like which may, by a very simple and almost instantaneous operation be converted from a manually operable to an automatic recording scale and vice versa.

Another object of the invention is to provide an automatic recording scale of the kind specified adapted to weigh cars while in motion over the scale platform in which the weight-recording mechanism is controlled by a timing device which will automatically insure that the car being weighed is disposed upon the scale platform for a period of time sufficient to insure the correct weight thereof to be ascertained and recorded.

A further important object of the invention is to provide an automatic recording scale of the kind specified in which the recording mechanism is automatically rendered inoperative in the event that more than one car is disposed upon the scale platform.

Other objects of the invention will be apparent from the following specification and the appended claims.

The invention consists in the features of construction and combinations of parts hereinafter fully described and particularly claimed.

In the accompanying drawings illustrating a suitable embodiment of the invention:

Figure —1— is a view in side elevation of a track scale constructed in accordance with the invention, certain parts being broken away and shown in fragment.

Fig. —2— is an end elevation of the same partly in vertical transverse section, certain parts being shown in fragment.

Fig. —3— is a fragmentary detail top plan view of the scale platform and weighing and recording mechanism.

Fig. —4— is a fragmentary detail vertical longitudinal section of the scale platform.

Fig. —5— is a view in side elevation of the weight-recording mechanism and timing means controlling the same.

Fig. —6— is a plan section of the same on the line 6—6 of Fig. —5—.

Fig. —7— is a vertical longitudinal section of the same on the line 7—7 of Fig. —6—.

Fig. —8— is a vertical longitudinal section of the same on the line 8—8 of Fig. —6—.

Fig. —9— is a vertical transverse section of the same on the line 9—9 of Fig. —5—.

Fig. —10— is a fragmentary detail end elevation looking at the left-hand end of Fig. —8—.

Fig. —11— is a vertical transverse section of the same on the line 11—11 of Fig. —5—.

Fig. —12— is a fragmentary detail view in elevation illustrating the sliding carriage effecting connection between the recording mechanism and the means on the scale platform actuated by the car wheels controlling such recording mechanism.

Fig. —13— is a fragmentary detail vertical section on the line 13—13 of Fig. —12—.

Fig. —14— is a fragmentary detail vertical longitudinal section on the line 14—14 of Fig. —15— showing the time control mechanism of the scale.

Fig. —15— is a top plan view of the same.

Figs. —16— and —17— are respectively vertical transverse sections on the lines 16—16 and 17—17 respectively, of Fig. —15—.

Fig. —18— is a fragmentary detail plan section on the line 18—18 of Fig. —1—.

Fig. —19— is a vertical transverse section on the line 19—19 of Fig. —18—.

Fig. —20— is a fragmentary detail view in elevation showing a part of the connection between the scale platform track devices and the weight-recording mechanism of the scale.

Fig. —21— is a fragmentary detail vertical section on the line 21—21 of Fig. —1—.

Fig. —22— is a fragmentary detail section on the line 22—22 of Fig. —21—.

Fig. —23— is a detail perspective view of the wedge-block shown in Figs. —21— and —22—.

The scale comprises a platform 1 which is suitably interposed in a railroad track, and is provided with two pairs of rails 2 and 3 respectively. The rails 2 are equipped with levers 4 adapted to be actuated by the car-wheels of a car passing over the scale platform preparatory to weighing the same, whereas the rails 3 may be termed idle rails permitting cars to be shunted over the scale platform without being weighed.

The scale platform 1 is suitably constructed, as particularly shown in Fig. —4—, to give it the necessary strength and rigidity, and is suitably suspended from scale beams or levers so that it may move vertically under the influence of weight imposed thereon to actuate the weighing and recording mechanism as hereinafter more particularly described.

The particular mechanism for effecting connection between the said platform and the scale beam and weight-recording mechanism of the scale, constitutes no part of my present invention except to the extent indicated in the appended claims. The movements of the scale-platform under the influence of weight imposed thereon is suitably transmitted to the scale-beam 5 which is pivotally supported in a suitable manner upon a vertically movable plunger within the standard 6 and carries the load on the platform by means of the member 7 supported upon the scale pivots 8 of said beam 5 contiguous to the pivotal axis of the latter. The scale-beam 5 carries the bar 8 containing a graduated scale on which the slidable poise 9 is adapted to register, and is equipped at its other end with a counterpoise 10 which is adjusted when adjusting the scale for balancing the latter in a well-known manner. The poise 9 is normally positioned, as shown in Fig. —1—, being used practically solely for purposes of adjusting the scale.

By referring to Fig. 21 it will be seen that the standard 6 is hollow and contains the plunger $6^a$ which is bifurcated at its upper end, the arms thereof being equipped with fulcrum plates on which the pivots of the beam 5 rest. The lower end of the said plunger $6^a$ is inclined and rests upon a wedge $6^b$ movable laterally of said beam. The said wedge is provided with a threaded opening in which the screw-shaft $6^c$ engages, the latter being equipped with the crank $6^d$ at one end and the ratchet-wheel $6^e$ at its other end, both externally of the standard 6 and engaging the latter to hold said shaft against longitudinal movement.

The said ratchet wheel is adapted to be engaged by the spring-held pawl $7^a$ pivotally mounted between its ends on the standard 6, and which normally prevents the said shaft from rotating in a direction to effect a lowering of the plunger $6^a$.

At the outer end portion of the longer end of the scale-beam 5 there is suspended a weight-receiving carriage 11 which is adapted to carry the several weights 12, in the usual manner. The extreme outer end of said portion of said scale-beam 5 is connected with the piston rod 13 of the plunger of the dash pot 14. This particular portion of the scale constitutes no part of the present invention and may be of the construction particularly described and illustrated in my copending application for Letters Patent filed the 17th day of November, 1916, Ser. No. 131971, including also the gearing for connecting the scale-beam with the printing wheel 15 of the weight-recording mechanism, detailed description of which will, therefore, be omitted here.

The present construction also includes means for disconnecting the scale-beam from the scale-platform, which is desirable at times when cars are being shunted over the scale platform which it is not desired to weigh, and also sometimes when it is desired to weigh cars by manual adjustment of poises, or the like, and for purposes of adjustment. Such disconnection is effected by means of a walking beam 16 which is suspended at one end from a hook 17 which is in turn suspended from an auxiliary scale-beam positioned above the framework or housing containing the scale-beam 5, and other mechanism, previously described. Said auxiliary scale beam is omitted from illustration as constituting no part of the present invention. The yoke 7 is provided with pivot plates 18 above the pivot plates for the scale pivots 8. These pivot plates 18 are adapted to be engaged by the scale pivots 19 mounted between the ends of the beam 16, the other end of the latter being provided with pivots 20 adapted to be engaged in the yoke 21 which is adapted to be raised and lowered by means of a screw-shaft rigid with the crank 22 and adapted to be manually actuated. When the last-named end of said walking beam is raised the scale pivots 8 of the scale-beam 5 will be relieved of load, and the latter will thereupon become imposed upon the walking beam 16 as the pivots 19 of the latter engage the pivot-plates 18 of said yoke 7. The load on the yoke will then be transmitted by means of the hook member 17 to the auxiliary scale beam, not shown, but which may be used as above set forth and for so-called "hand-weighing" as distinguished from automatic weighing.

As shown in Fig —1— one end of the pawl 7ª engages in the longitudinal slot in the lower end of a connecting rod 7ᵇ which is suspended from the yoke 21 so that as the latter is raised to engage the pivot 19 with the yoke 7, said rod automatically throws the pawl 7ª out of engagement with the ratchet 6ᵉ, whereupon the latter may be rotated to lower the plunger 6ª and the scale beam 5 to throw the pivots 8 of the latter out of engagement with the yoke 7 so that the latter is thereupon suspended only from the pivots 19 for "hand-weighing".

When it is desired to use the automatic weighing means including the scale-beam 5, the pivots 8 are first raised to the position shown in Fig. —1— and then the yoke 21 is lowered, thus lowering the pivots 19 and leaving the yoke 7 suspended from the pivots 8. Thus the yoke 7 is maintained always at a predetermined elevation because until the yoke 7 is raised to throw the pivots 19 into contact with their fulcrum plates, the crank 6ᵈ can not be rotated in a direction to lower the pivots 8. Obviously the vertical movements of the yoke 7 under the influence of load-variations on the scale platform which is connected therewith, is very slight so that if the yoke 21 is lowered before the pivots 8 are raised, the scale becomes inoperative which is, of course, immediately apparent.

The printing wheel 15 is rotatably supported on anti-friction rollers 23 suitably supported in the scale housing. The said wheel 15 is provided on its circumferential face with groups of numerals constituting what might be termed a graduated scale from which any group of ordinals indicating the weight of the load on the scale platform is printed on a card by means of the printing mechanism, which will be hereinafter more fully described, and of which said printing wheel constitutes a part. The said printing mechanism is disposed in and upon a housing 24 mounted upon the housing containing said printing wheel 15 and part of the mechanism operatively connecting the same with the scale-beam 5 for actuation by the latter. Said printing mechanism includes a vertically reciprocable plunger 25 mounted in suitable guides 26 carried at one end of said housing 24. Said plunger is provided on its lower face with a suitable pad 27 of a yielding material, such, for example, as leather, which is adapted to strike a card or similar record-receiving element interposed between the printing face of the wheel 15 and said plunger 25. The latter is provided between its ends with a slot 25' in which one end of a lever 29 engages. The end of the lever 29 which is in the slot 25' is yieldingly held against the wall at the lower end of the slot by a compression spring 25ª which is mounted in an opening in the plunger 25 being retained in said opening by a screw plug 25ᵇ. The latter is pivotally supported between its ends upon a stud 30 within the housing 24. On said pivotal support for the lever 29 a lever 31 is pivotally mounted, the latter being provided with a pair of projections between which an anti-friction roller 32 is mounted, which is held in engagement with the circumferential face of a disk 33 by means of the tension spring 34 engaged with said arm 31 and with a projection 35 of the housing 24. The lever 29 is engaged with a helical tension spring 36 for effecting a depression of the plunger 25 when the lever 29 is released for recording a weight by means of trip mechanism contained in said housing 24, and of which the disk 33 constitutes a part.

The said other end portion of the lever 29 constitutes what might be termed a cam member 37. The latter includes a beveled cam surface 38 on one side face of the member 37 and which terminates in a vertical shoulder 39 bordering one end of an arcuate cam surface 40 which is normally concentric with the shaft 41 on which the said disk 33 is mounted. At its outer end the said member 37 is provided with a recess 42 in which a latch-plunger 43 engages for normally supporting the said bell-crank lever in the position shown in Figs. —5— and —7—, and which is released from engagement in said recess 42 to permit the plunger 25 to be depressed by mechanism which will be hereinafter more particularly described.

The said member 37 is further provided with what may be termed a flat cam surface 44 which is engaged by the four-armed cam 45 rigid with the disk 33 during rotation of the latter. Said cam 45 is provided with substantially radial portions 46 constituting the terminals of arcuate surfaces 47. The latter are adapted to turn the lever 29 against the action of the spring 36 to the position shown in Figs. —5— and —7—, and the latter is adapted to effect a sudden depression of said plunger 25 as each of the portions or shoulders 46 of the cam 45 pass the shoulder 39 of the member 37 of said lever 29.

Rigid with the said cam 45 and disk 33 are two ratchet wheels 48 and 49 respectively. The latter is engaged by a pawl 50 pivotally mounted on a horizontally disposed reciprocable plunger 51 mounted in the guides 52 carried by the housing 24; said pawl being held in engagement with said ratchet 49 by means of the tension spring 53 engaged with said pawl and with a projection on said plunger 51. The said ratchet 49 is provided with sixteen equally spaced teeth and is adapted to be turned through an arc equal to the distance between two contiguous teeth at each reciprocal movement of said plunger 51 so that during four complete strokes of the latter said ratchet and said disk 33 and cam 45 will be rotated through an arc of ninety degrees. It will be noted that the cam 45 has four arms, and that the disk 33 is equipped with four peripheral recesses 54 in which the roller 32 is adapted to engage so that for each quarter turn of said ratchet 49 said cam 45 will be rotated to effect one reciprocal stroke of the plunger 25, the roller 32 and arm 31 constituting merely a latch element for holding the disk 33, and parts associated therewith, firmly in position between the intervals of actuation of the said plunger 25. The ratchet 49 is also engaged by the spring-actuated pawl 55 which serves merely to hold it and the parts associated therewith against reverse rotation after each actuation thereof by the pawl 50 and plunger 51.

The ratchet 48 has a greater number of teeth than the ratchet 49 and said teeth are oppositely faced and are engaged by a plunger 56 horizontally reciprocable in a guide 57 of the housing 24 which is connected with the plunger 51 by means of the connecting bar 58 so that as said plunger completes its forward stroke, the plunger 56 is thrown into engagement with the ratchet 48 and is withdrawn from such engagement as the said plunger moves back after having actuated the ratchet 49. Said plunger 56 performs the function of preventing the ratchet 49 and parts connected therewith from being rotated through an arc in excess of ninety degrees at each reciprocable movement of the plunger 51, as will be obvious.

The said plunger 51 is equipped at one end with an anti-friction roller 59 which engages in the eccentric slot 60 of a cam 61 pivotally mounted on the stud 62 of the housing 24, and which is adapted to be rotated through an arc of about ninety degrees by means of the reciprocable plunger 63 connected with the crank pin 64 of said cam 61, and also connected, as will be hereinafter described, with one of the levers 4 at the delivery end of the scale platform 1.

The two rocking levers 4 are disposed at opposite ends of the scale platform 1, and are separated a distance sufficient so that at the normal speed of the car passing over the platform, and which is to be weighed, the whole car will be disposed upon the platform at least two seconds; this being a sufficient length of time to enable the weight actuated parts of the weighing and recording mechanism to come to rest to correctly indicate the weight of said car. Freight cars usually have two trucks of four wheels each, and as the four wheels at one side of the car pass over the lever 4 at the entrance end of the platform, which is the left-hand end of Fig. —1—, said lever at that end will be rocked four times, thereby setting the recording mechanism for actuation to print the weight of the load as soon as the first wheel strikes and depresses the lever 4 at the outlet or delivery end of the platform 1. The instant that said last-named lever 4 is thus depressed by one wheel the printing is done, and the remaining operations of the last-named lever 4 serve only to throw the said printing mechanism again into position for actuation as the first wheel of the next succeeding car weighed strikes said lever at said delivery end of said platform. The weight-recording mechanism is controlled by a timing device or governor, which will be hereinafter described, which prevents the plunger 25 from making its down or printing stroke unless a predetermined time has elapsed between the last down-stroke of the lever 4 at the entrance end of the platform, and the first stroke of the lever 4 at the other end of the latter.

The lever 4 at the entrance end of the platform also performs another function which is to prevent the weight of a car on the platform from being recorded in the event that another car follows the first-named onto the platform, before the weight of the first car has been recorded. Thus this mechanism prevents a car from being weighed unless it has been upon the platform for a sufficient length of time, and, second, unless all four wheels at one side of the car (which would obviously mean that all eight wheels of the car must be on the platform) are on the platform at the time the weight is recorded, and third, it prevents all of one car and part of another car from being simultaneously weighed.

The means whereby this is accomplished will now be fully described.

The lever 4 at the delivery end of the scale platform 1, which we will assume to be at the right-hand end of Fig. —3—, is spaced from the lever 4 at the other or right-hand end of said scale platform, a distance somewhat greater than that separating the trucks of a freight car so that after two wheels at one side of the forward truck of the car entering upon the platform and two wheels at one side of the rear truck of the car have successively engaged the lever 4 and rocked the same once for each of four wheels passing over the said lever, the car will pass on and similarly rock the other of said levers four times. It will be observed that, as shown in Fig. —4—, each of the levers 4 is provided contiguous to one end with a stud passing through and pivotally engaged with the web of one of the rails 2, and that to the opposite end of said stud there is secured an arm 65 provided with a plurality of perforations 66.

By means of a connecting rod 67 engaged in one of said perforations 66 the said lever 4 at the delivery end of the platform 1 is connected with one arm of a bell-crank lever 68 pivotally mounted upon a depending bracket 69 secured to one of the beams of the scale platform. The other arm of said bell-crank lever 68 is in turn connected by means of the connecting rod 70 with one arm of a horizontally disposed bell crank lever 71 pivotally mounted upon a suitable support 72 secured below the scale platform. The other arm of said bell-crank lever 71 is connected by means of the connecting rod 73 with one arm of a bell-crank lever 74 pivotally supported at its elbow on a bracket 75 mounted below and rigid with the frame and housing of the weighing and recording mechanism of the scale. The other arm of the bell-crank lever 74 is connected by means of a connecting rod 75$^a$ with one arm of a bell-crank lever 76, the other arm of which is pivotally connected with the said plunger 63. The other of the said rocking levers 4 is similarly connected with a plunger 77 extending parallel with the plunger 63, and actuating another eccentric cam 78, the function of which will be hereinafter more fully described.

As shown in Figs. —2— and —3— the connecting rods 73 have tension springs 73$^a$ and turn-buckles 73$^b$ interposed between their ends. It will also be seen that the bell-crank levers 71 are connected by a tension spring 71$^a$. The latter maintains a tension on both connecting rods 70 and thus serves, as will be obvious, to hold the track-levers 4 normally at the upper limits of their movement. The springs 73$^a$ maintain tension on the rods 73 thus avoiding any lost motion in the transmission of movement from the track-levers 4 to the bell-crank levers 74. The bracket 75 carries two stop projections 74$^a$ and 74$^b$ for each of said levers 74 for limiting the pivotal movements of the latter.

The pivots for the two bell-crank levers 76 are mounted on a vertically movable carriage 76$^a$ shown in detail in Figs. —12— and —13— and which is mounted in suitable guides carried by the standard 76$^b$. The said carriage is connected with both the bell-crank levers 74 by means of connecting rods 76$^c$ each of which has a tension spring 76$^d$ interposed between its ends. Pivotally mounted on the standard 76$^b$ is a lever 76$^e$ rigid with which is a projection 77$^a$ which is adapted to engage the carriage 76$^a$ to raise the same against the action of the springs 76$^d$ and support the same. When the said carriage is thus supported the bell-crank levers 74 will be thrown against the stop projections 74$^a$ thus imparting tension to the springs 73$^a$. When the carriage 76$^a$ is lowered, the springs 73$^a$ are slack thus preventing the transmission of motion from the bell-crank levers 71 to the bell-crank levers 74, thus throwing the recording mechanism of the scale out of action.

The cam 61 is normally held in the position shown in Fig. —5— by means of a tension spring 78$^a$ connected with a projection contiguous to the crank pin 64 and with a projection 79 on the housing 24.

It will be readily understood from the foregoing description that as the two wheels of the front truck of the car enter upon the scale platform 1 and pass over the left-hand lever 4 the latter is twice rocked and again when the wheels of the rear truck pass over the same, thus operating the cam 78 the same number of times. This effects reciprocation of a plunger 90 vertically reciprocable in guides in said housing 24 and thus four actuations of a ratchet wheel 86, and the parts rigid therewith, including the disk 83, which is practically identical with the disk 33. At the first stroke of the plunger 51 occurring when the first wheel of the car strikes the right-hand lever 4 the cam 45 will be moved through an arc equal to the distance separating two contiguous teeth of the ratchet 49 thereby causing that arm of the cam 45 engaged with the arm 37 of the lever 29 to pass the shoulder 39 of the latter so that at this moment the plunger 25 is free to operate except for the fact that it is held against such operation by the latch member 43. The latter is associated with and controlled by mechanism which is actuated by the left-hand rocking lever 4 at the time that the first or left-hand rocking lever 4 is actuated by the wheels of the car. All of the latter will not be disposed upon the scale platform, but when said front truck has moved to a point contiguous to the right-hand rocking lever 4, the entire car will be disposed upon the scale platform, and the latter will accordingly be depressed by the weight of said car, thus affecting a rotation of the printing wheel 15 to bring the numeral on the printing face thereof indicating the weight of the load opposite the padded lower face of the plunger 25, so that, at this moment, the weight is capable of being recorded. The recording is not, however, effected until the front wheel has passed upon the second rocking lever 4 at which time the said latch 43 is withdrawn from the recess 42 to release the arm 37 and enable the plunger to be depressed forcibly by the action of the spring 36 to print the weight of the car on the card interposed between the printing wheel 15 and said plunger 25. The release of the latch 43 occurs as soon as the first wheel of the truck shall have passed over the second rocking lever 4 provided that the time elapsing between four actuations of the left-hand lever 4 and the first actuation of the right-hand lever 4 shall have been sufficient to release the time lock hereinafter described, and which is controlled by the disk 83 and parts associated therewith.

The latch member 43 is, as shown in Fig. —8—, disposed within a plunger 43$^a$ and is held at the forward limit of its movement in contact with a stop projection 43$^b$ by means of a compression spring 43$^c$. The said plunger 43$^a$ carries a projection 82 which normally bears upon the periphery of the disk 83, said plunger being held at the rearward limit of its movement by means of the tension spring 83$^a$. The shaft of the disk 83 passes through a longitudinal slot in said plunger 43$^a$ and constitutes a guide for the latter.

It will be seen from this construction that, as the disk 83 is turned through an arc of ninety degrees, the projection 82 will spring into one of the recesses 85 of said disk, thereby withdrawing the latch member 43 from engagement in the notch 42 of the member 37, thus leaving the plunger 25 free to make its down stroke except for the fact that the same is held against making such stroke by the time-lock or governor hereinafter described, and which is also controlled by the movement of the disk 83.

Rigid with disk 83 are ratchet wheels 86 and 87 corresponding respectively to the ratchet wheels 48 and 49 associated with the disk 33. The said ratchet wheel 87 is engaged by the spring-actuated pawl 88 which serves only to prevent rotation of the disk 83 in the reverse direction from that in which it is turned by the engagement of the ratchet 86 with its actuating pawl 89. Both pawls 88 and 89 are pivotally mounted on the vertically reciprocable plunger 90 carrying the anti-friction roller 91 which engages in the eccentric slot of the eccentric cam 78, the latter being, as previously described, connected with the reciprocable plunger 77 and through the latter and the chain of connections heretofore described with the left-hand rocking lever 4 on the scale platform 1. Thus the pawl 88 performs the same function as the pawl on the plunger 56 performs, and the pawl 89 performs the same function as the pawl 50. The pawl 89 is held in engagement with the ratchet 86 by means of the tension spring 92, whereas the pawl 88 is held firmly in the position shown in Fig. —5— by means of the flat spring 93 and stop projection 94 of said pawl engaging each of the plungers 90 and is capable of slight upward movement against the action of said spring 93.

As the said left-hand rocking lever 4 is actuated by the passage of the four wheels at one side of the front truck of the car to be weighed, the said disk 83 will be turned through an arc of ninety degrees, and during such revolution the latch member 43 will be sprung into and out of the recess 42 to unlock and lock the arm 37. A lever 92$^a$ pivotally supported between its ends on a part of the housing carries a projection 94 and will be rocked as the latter springs successively into and out of the recesses 85 of the said disk 83. The other end of said lever carries a pivoted pawl 95 which is adapted to actuate a ratchet wheel 96 rigid with a ribbon take-up reel 97 carried by a shaft 98 journaled in bearings in the walls of a small housing 99 mounted upon one end of the housing 24.

Figure 7:
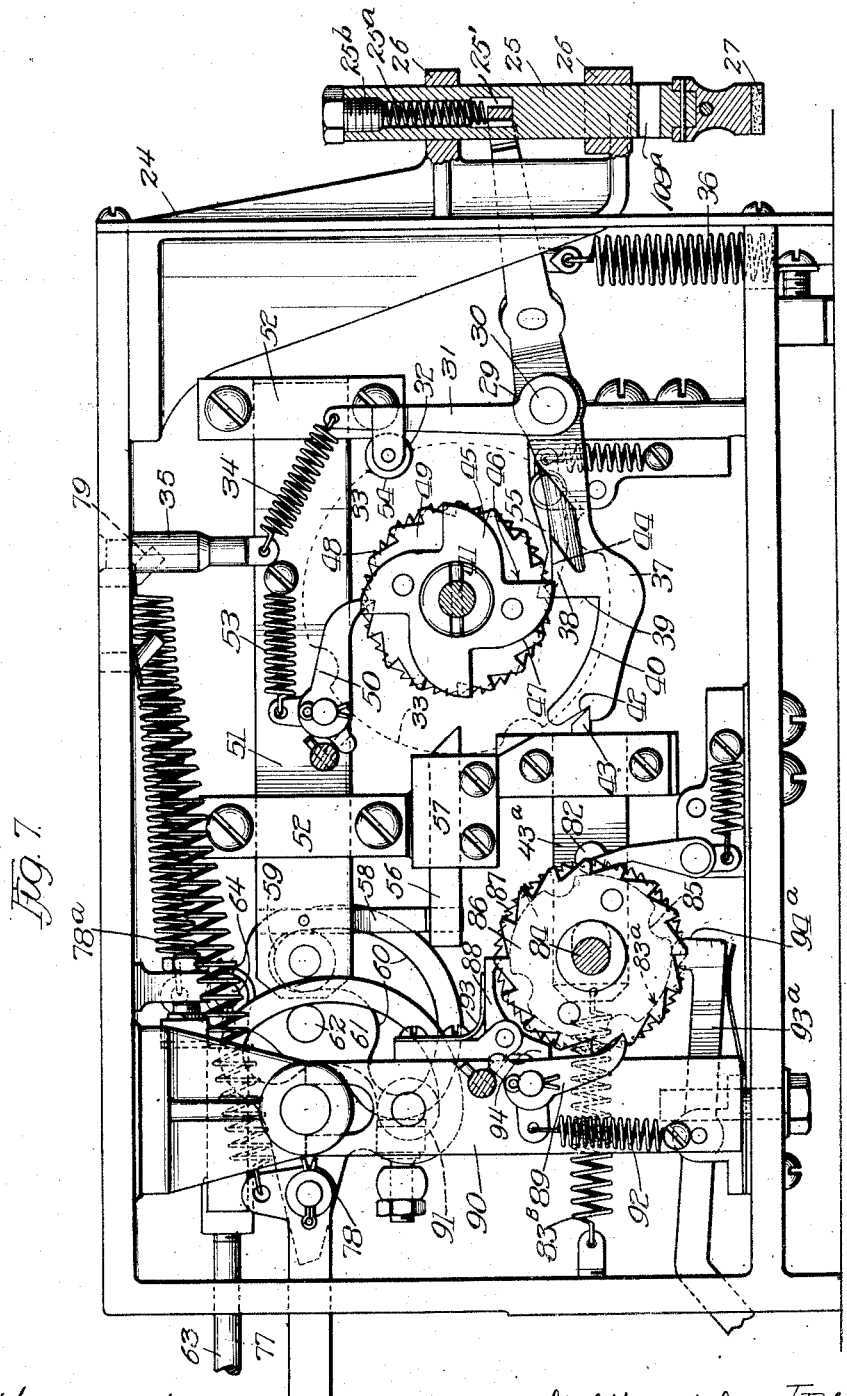
Figure 8:
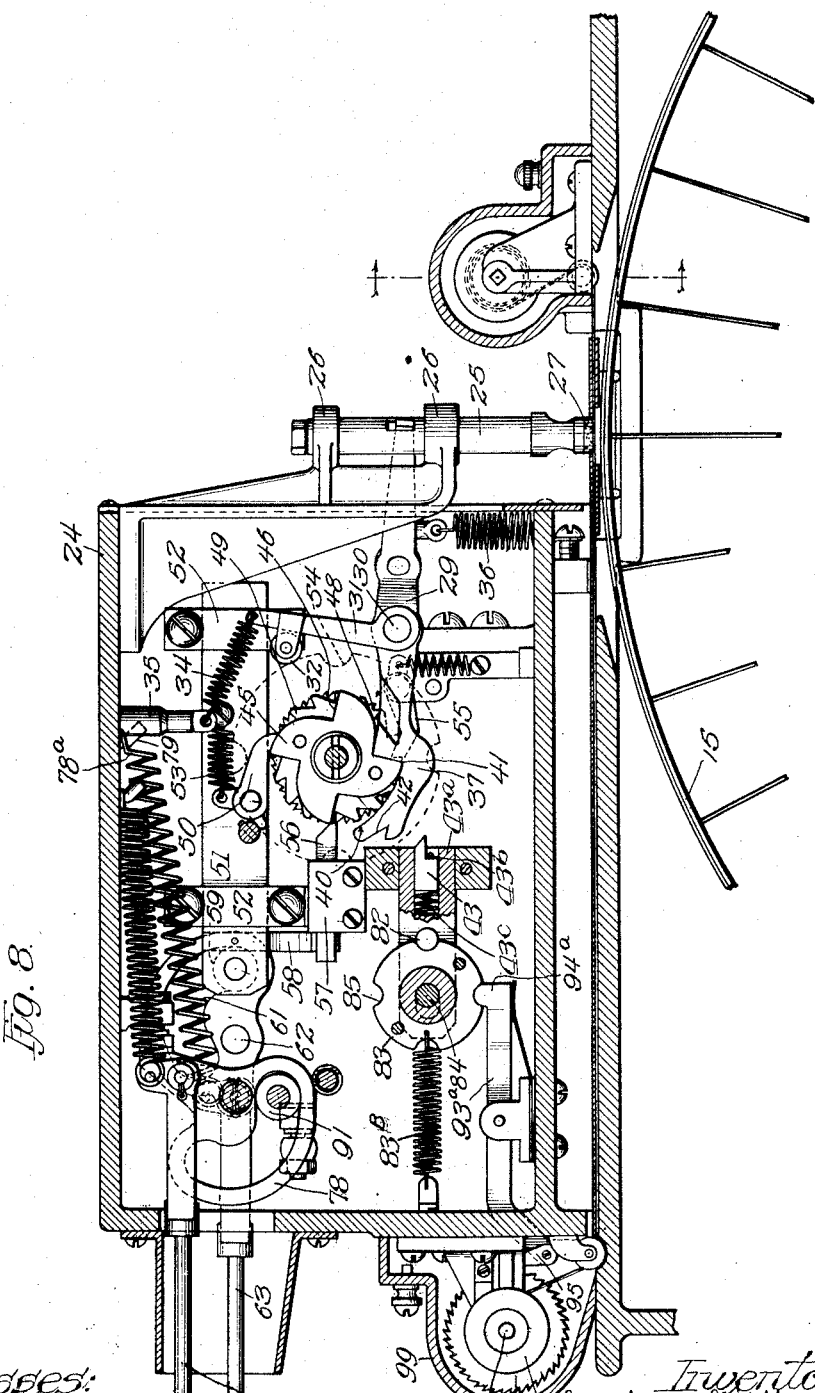
Figure 9:
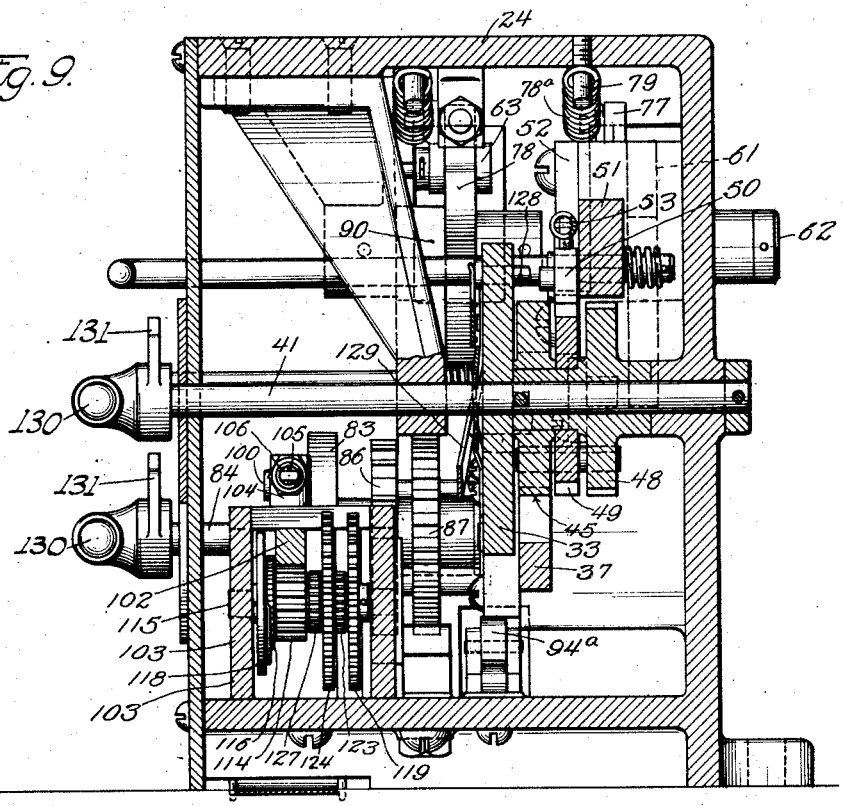
Figure 10:
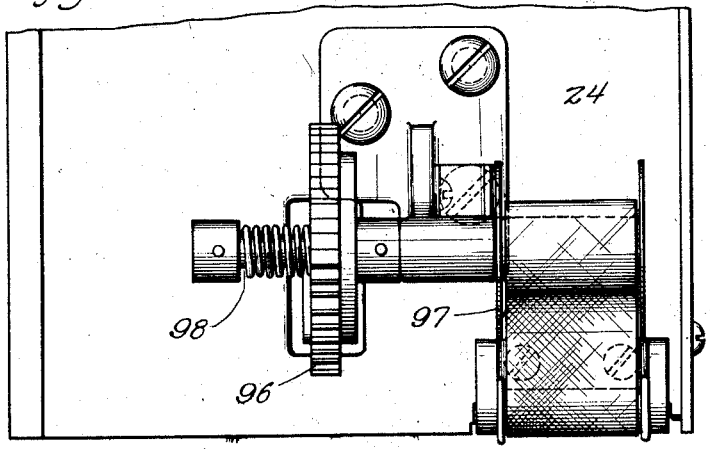

The disk 83 also carries four projections 100 equidistantly separated and extending from a side face thereof, each thereof being equipped with an anti-friction roller. Disposed in the path of said projections is the arcuate end 101 of a reciprocable rack bar 102 mounted in guide recesses in the end walls of a small housing 103 disposed within the housing 24. The said housing 103 is equipped with a projection 104 in which a threaded member 105 is engaged and adapted to be longitudinally adjusted. A helical spring 106 is engaged at one end with said threaded member 105 and at its other end with a projection 107 on the plunger 102, thus normally drawing the projection 107 toward the projection 104 and throwing the arcuate end of the plunger 102 into the path of said projections 100 of the disk 83. At its other end said plunger 102 carries a head 108 projecting downwardly therefrom and through an opening in which a plunger 109 passes. The latter is movable in a guide opening in an end wall of the housing 103 and in a similar opening in the outer end or arm 110 of a bracket 111 mounted upon said end wall of said housing. Said plunger 109 is provided with a collar 112 rigid therewith, and between which and the opposed face of the head 108 a helical compression spring 113 is interposed which serves to normally hold said plunger 109 at the forward limit of its movement. This is determined by the adjustable collar 114 on said plunger 109, which is adapted to engage the other face of the head 108. The spring 113 is preferably very light and its pressure overcome by the tension of the spring 106. Said plunger 102 is moved and held against the action of the spring 106 by the several projections 100 successively, and thus the spring 113 is compressed against the collar 112 forcing the latter into engagement with the arm 110 and moving the forward end of the plunger 109 into an opening 109ᵃ in the plunger 25 below the lowermost of its guides, see Figs. 5 and 7, the plunger 109 being omitted from Fig. 7. The rack-bar 102 meshes with a spur gear 114 rotatably mounted on a shaft 115 journaled in bearings of the side walls of the housing 103. Rigid with said spur gear 114 is a ratchet wheel 116 which is engaged by the spring-actuated pawl 117 pivotally mounted on a disk 118 which is keyed to the shaft 115. Hence, as the rack bar or plunger 102 is moved in the direction to throw the end of the plunger 109 into the opening in the plunger 25 the ratchet wheel 116 will rotate independently of the disk 118; whereas upon a reverse movement of said plunger or rack 102 the disk 118 will be rotated with the ratchet. Rigid with the disk 118 is a large diameter spur 119. The latter meshes with a spur pinion 120 on a shaft 121 parallel with the shaft 115. Rigid with the spur pinion 120 is a latch spur gear 122 which in turn meshes with a spur pinion 123 rotatable with relation to the shaft 115 and concentric therewith. The spur pinion 123 is rigid with the spur gear 124 which meshes with the spur pinion 125 on the shaft 121 which is rotatable relatively to the gear 122. Rigid with the spur pinion 125 is a large spur gear 126 which meshes with the spur pinion 127 concentric with and rotatable relatively to the shaft 115 and the other gears, etc., carried thereby. This train of gears obviously offers resistance to the movement of the rack-bar or plunger 102 in the direction in which it is drawn by the tension spring 106, and constitutes a governor to retard such motion. By adjusting the tension of said spring 106 and adjusting the collar 114 the degree to which this motion of the plunger 102 is retarded may be varied so that said plunger requires anywhere from one-half a second to about six seconds to complete so much of its stroke as is necessary to effect withdrawal of the plunger 109 from the opening in the plunger 25 to release the latter.

By reference to Fig. —5— it will be seen that the plunger or rack 102 and the plunger 109 are both at the rearward limits of their movement so that the plunger 25 is released ready for operation and that at this time one arm of the cam 45 is positioned so that upon the next stroke of the plunger 51 it will pass the shoulder 39 of the arm 37 to release the latter. If now the latch member 43 is disengaged from the recess 42 then the plunger 25 will make its printing stroke. But if the plunger 109 is not yet withdrawn from engagement with the plunger 25 then the weight will not be recorded, this being due to mechanism associated with the disk 33 and cam-member 37.

Mounted in the said disk 33 and reciprocable in a direction parallel with the axis of rotation thereof are four short plungers 128 each of which is held normally projecting from one face of the disk by means of a flat spring 129 secured at one end to the opposite face of the disk and bearing upon one end of such plunger. The said plungers are disposed relatively to the substantially radial faces of the cam 45 so that each of the plungers 128 will spring past the shoulder 39 very slightly after its companion substantially radial face of said cam member 45 has sprung past the same. It will be remembered that the cam member 37 is provided contiguous to the said shoulder 39 with an inclined or beveled face. As each of the plungers comes in contact with said face it is forced inwardly against the action of the spring 129.

Obviously as soon as the plunger 109 is withdrawn from engagement with the plunger 125, the latch 43 being at this time disengaged from the recess 42, said plunger will make an instantaneous downward stroke as soon as one of the aforesaid substantially radial faces of the cam 45 has passed said shoulder 39 and before the plunger 128 has passed said shoulder. In that case that portion of the member 37 disposed below the arcuate face 40 thereof will become positioned in the path of said plunger 128 which will not then be moved to the normal limit of its movement by the spring 129 engaging the same until it has passed the end of said member 37. If, however, at the time the said radial face of the cam 45 has passed the shoulder 39 the plunger 109 has not been withdrawn from engagement with the plunger 125 then the said companion plunger 128 will spring outwardly as it passes the shoulder 39 and become disposed in the path of the arcuate surface 40 of said member 37, thereby preventing the plunger from being depressed after the plunger 109 has been withdrawn from engagement therewith. Thus the car will pass off the platform without its weight being recorded and will have to reënter the platform to be reweighed.

The remaining three strokes of the right-hand lever 4 of the scale platform following the first or recording stroke thereof serves merely to return the disk 33 again into position for operation to weigh the next car passing over the platform.

If at the time the weight of one car on the platform is about to be recorded and said car has remained on the platform the requisite length of time to permit the record to be made, a second car should enter the platform, then again the weight cannot be recorded for the reason that the moment the first wheel of the next succeeding car enters the platform it will depress the left-hand lever 4 thereby actuating the disk 83, and moving it through an arc equal to one-sixteenth of its circumference. This movement of said disk 83 will instantly throw the latch-member 43 into the recess 42 of the member 37 thus locking the same against movement and preventing the down or printing stroke of the plunger 25. Thus it becomes impossible for the weight of any car to be recorded unless it is entirely disposed upon the platform 1 and unless it is the only car contained thereon in whole or in part.

Rigid with the shaft of each of the disks 33 and 83 are manually operable handles 130 and rigid therewith are pointers 131 which are so disposed relatively to the disks as to indicate on the exterior of the housing 24 when the said disks 33 and 83 are respectively properly positioned for the operation of the scale. Each of the pointers registers on four equally spaced graduations ninety degrees apart, and unless at the time the car is about to enter the platform 1 said pointers register respectively with one of each of the graduations referred to, the recording mechanism will be inoperative to record the weight of the car. Thus the scale operator must see to it that the disks are properly positioned before the car enters upon the platform, and that the carriage is raised by the lever 76ᵉ as otherwise no record of the weight of the car will be made. It may also happen that one of the wheels of a car to be weighed has part of its flange broken away so that said wheel might pass over a lever 4 without depressing the latter. In that event the operator would instantly operate the proper handle 130 to throw its disk 33 or 83 through the requisite arc whereby the correct weight would be ascertained and recorded.

The ribbon take-up reel previously described causes an inked ribbon to be fed between the printing wheel and the card receiving the printed record of the car weight, said ribbon being movable to present a clean or well-inked portion after each operation of the plunger 25.

It is sometimes desired to shunt cars over the scale platforms (as for example, empty cars) without weighing the same. On such occasions the operator throws the lever 76ᵉ to lower the carriage thereby throwing the recording mechanism out of action.

It is believed that the invention will be fully understood from the foregoing description.

While I have illustrated in the accompanying drawings the preferred embodiment of the invention adapted for present day freight cars, it will be observed, of course that such construction may be changed and varied to adapt the scale to cars having trucks of more than four wheels each and to any other purpose as mechanical skill and judgment may dictate without departing from the invention as defined in the appended claims.

I claim as my invention:

1. In an automatic weighing scale of the kind described equipped with weight recording mechanism, including an impression member, and means for locking the said member in inoperative position, mechanism adapted to be actuated by the moving vehicle on the scale platform to release said locking mechanism when the vehicle is wholly on the platform, and time-governed mechanism associated with the impression member and for preventing the operation thereof, said mechanism being controlled by the vehicle when wholly positioned on the platform to become released a predetermined time thereafter.

2. In an automatic scale for weighing vehicles in motion equipped with weight recording mechanism, including an impression member, mechanism adapted to be actuated by the moving vehicle to release the recording mechanism when the vehicle reaches a position wholly on the platform, and a time lock associated with the impression member for preventing operation thereof until a predetermined time has elapsed after the vehicle has entered wholly upon the platform.

3. In an automatic scale of the kind described, equipped with weight recording mechanism, including an impression member, mechanism adapted to be actuated by the moving vehicle to release the recording mechanism when the vehicle is wholly on the platform, and time-governed mechanism associated with the recording mechanism for preventing the operation of the recording mechanism until a predetermined time has elapsed after its release by the vehicle after the disposition of the vehicle wholly on the platform.

4. In an automatic weighing scale of the kind specified, equipped with weight-recording mechanism, including an impression member, and means for locking said member in inoperative position, mechanism adapted to be actuated by the moving vehicle when wholly on the scale-platform for releasing the recording mechanism, said mechanism including means for automatically determining the minimum time of travel of the load to be weighed between given points on the scale platform in which the weighing mechanism can operate.

5. In an automatic weighing scale of the kind specified, weight-recording mechanism, a time-lock associated therewith for determining the duration of imposition on the scale platform of the load to be weighed and recorded, mechanism associated with and controlling the time-lock and recording mechanism, and means on the scale platform adapted to be actuated by the vehicle moving over the same associated with said controlling mechanism for actuating the latter.

6. In an automatic weighing scale of the kind specified, equipped with weight-recording mechanism, mechanism adapted to be actuated by the moving vehicle on the scale-platform for controlling the recording mechanism, said mechanism including means for automatically determining the minimum time of travel of the load to be weighed between given points on the scale platform.

7. In an automatic weighing scale of the kind specified equipped with weight recording means, mechanism associated therewith for setting said means preparatory to effecting recording, mechanism for effecting a recording action of said means, a lever associated with each of said mechanisms and adapted to be successively operated by the moving load to be weighed for actuating said respective mechanisms at different intervals and timing means associated with said mechanisms for controlling the operation thereof independently of said levers.

8. In an automatic weighing scale of the kind specified, weight-recording means including a printing wheel adapted to be actuated by the load on the scale platform, a plunger associated with said wheel for effecting printing of the indicated weight on a card or the like, a spring for imparting a printing stroke to said plunger, mechanism associated with said plunger for setting the same against the action of said spring, a latch for holding the plunger in its set position, mechanism for releasing said latch, levers adapted to be successively actuated by the moving load to be weighed associated with said respective mechanisms for actuating the same at different intervals, and a governor associated with said latch and acting independently of the last-named levers for maintaining said plunger in set position unless the interval of time elapsing between successive actuation of said levers exceeds a given minimum.

9. In an automatic weighing scale of the kind specified, recording mechanism including a spring-actuated plunger, mechanism for setting said plunger against the action of said spring, trip-mechanism for releasing said plunger, and a lever associated with said setting mechanism and said trip mechanism respectively, adapted to be actuated at respectively different intervals by the load to be weighed for actuating said mechanisms to effect recording of the weight of said load, and a governor associated with said latch and acting independently of the last-named levers for maintaining said plunger in set position unless the interval of time elapsing between successive actuation of said levers exceeds a given minimum.

10. In an automatic weighing scale of the kind specified, recording mechanism including a spring-actuated plunger, a mechanism adapted to be actuated by the load to be weighed for setting and releasing said plunger at respectively different intervals, a latch member for supporting said plunger when released by said setting mechanism, and mechanism adapted to be actuated by the load for releasing said latch member, and means associated with said latch member and said trip mechanism for preventing operation of said plunger to record weight unless a certain time interval has elapsed after release of said latch-member.

11. In an automatic weighing scale of the kind specified, recording mechanism including a spring-actuated plunger, a mechanism for setting said plunger and then releasing the same, a latch-member for supporting said plunger to prevent movement thereof after its release by said setting mechanism, mechanism for releasing said latch, and means adapted to be actuated at different intervals by the load to be weighed for actuating said respective mechanisms, said latch releasing mechanism including a governor for retarding release of the plunger.

12. In an automatic weighing scale of the kind specified, recording mechanism including a spring-actuated plunger, a mechanism for setting said plunger and then releasing the same, a latch-member for supporting said plunger to prevent movement thereof after its release by said setting mechanism, a time-lock for engaging said plunger to support the same during a given interval after release by said setting mechanism and said latch-member, a mechanism common to said time-lock and said latch-member for throwing both thereof into locking position relatively to the said plunger and releasing the same, and means adapted to be actuated at different intervals by the load to be weighed for actuating said respective mechanisms.

13. In an automatic weighing scale of the kind specified, recording mechanism including a spring-actuated plunger, a rocking lever engaged therewith, a mechanism for actuating said lever to set said plunger against the action of its spring, a latch-member engaging said lever for holding it in the last-named position, a locking element for engaging said plunger to support the same independently of said lever and latch-member, a mechanism common to said latch and said locking element for throwing both the latter into engaging relation to the parts to be engaged thereby and thereafter releasing the same, and mechanism for retarding the releasing movement of said locking element.

14. In a weighing scale of the kind specified, weight-recording mechanism associated with the scale-beam, a timing device associated with said recording mechanism for preventing operation thereof for a predetermined period after the load to be weighed is disposed upon the scale-platform, and means adapted to be actuated by the load for setting said timing device during a portion of the travel of the load over the scale-platform and releasing the same at a given point in the travel thereof.

15. In a weighing scale of the kind specified, weight-recording mechanism associated with the scale-beam, a timing device associated with said recording mechanism for preventing operation thereof for a predetermined period after the load to be weighed is disposed upon the scale-platform, and means adapted to be actuated by the load for setting said timing device during a portion of the travel of the load over the scale-platform and releasing the same at a given point in the travel thereof, and mechanism adapted to be actuated by said load during travel and associated with said recording mechanism for setting the latter and including means for locking the same against movement when released as aforesaid.

16. In a weighing scale of the kind specified, weight-recording mechanism including a printing element geared to be actuated by the scale-beam, a coacting element, a spring for moving the same in one direction, a rocking-lever for setting same against the action of said spring, a cam engaging said lever for actuating the same for setting said coacting element including means for releasing the same at a given point in the movement of said cam, mechanism adapted to be actuated by the load for imparting movement to said cam, means associated with the latter and said lever for automatically holding said lever against movement by said spring when said lever is released by said cam, a timing device associated with said coacting printing element and said last-named means for controlling the release of said lever, and mechanism associated with said timing device adapted to be actuated by the load for setting and releasing the same.

17. In a weighing scale of the kind specified equipped with automatic weight-recording mechanism, means controlling the action of the latter to prevent recording of the weight of more or less than one car at a time including a lever adapted to be successively actuated by the wheels at one side of a car to be weighed, means associated with said recording mechanism and connected with said lever for setting the former during the passage of all except one of said wheels over said lever and positioning said recording means for operation as a predetermined wheel of the car actuates said lever, a second track lever adapted to be actuated by said wheels, means for locking said recording mechanism against operation associated therewith, said levers separated a distance greater than a car length, and adapted to be successively actuated for imparting movement to said mechanism synchronously to position the same cooperatively to effect recording of the weight of a load when both said track levers have been actuated once for each of all the wheels at one side of a car passing over the same at respectively different intervals and timing mechanism associated with said track levers and said recording mechanism for preventing operation of the latter during a predetermined interval between the successive operations of said respective track levers.

18. In a weighing scale of the kind specified equipped with automatic weight-recording mechanism, means controlling the action of the latter to prevent recording of the weight of more or less than one car at a time including a pair of levers disposed at opposite ends of the scale platform and each adapted to be actuated successively by the wheels at one side of the car to be weighed as the latter enters upon and leaves said platform, said levers separated a distance greater than the car length, mechanism associated with the recording mechanism and with the lever at the delivery end of the platform and adapted to be actuated by the latter for setting the latter in readiness to record weight as all except the front wheel of the car pass over said lever, mechanism associated with the recording mechanism and with the other of said levers, and adapted to be actuated by the latter for locking said recording mechanism in said set position as all except the rearmost wheel of the car passes over said lever, and adapted to release said mechanism to effect a weight-recording operation as the last wheel of the car passes over said lever, said recording mechanism adapted to be then released as the front wheel of the car actuates said lever at the delivery end of the platform, the lever at the receiving end of the latter adapted to effect locking of the recording mechanism against action in the event that said lever is again actuated before the front wheel of the car has actuated the other of said levers and timing means associated with said recording mechanism for controlling the operation thereof independently of said levers.

19. In a weighing scale of the kind specified equipped with automatic weight-recording mechanism, means controlling the action of the latter to prevent recording of the weight of more or less than one car at a time including a pair of levers disposed at opposite ends of the scale platform and each adapted to be actuated successively by the wheels at one side of the car to be weighed as the latter enters upon and leaves said platform, said levers separated a distance greater than the car length, mechanism associated with the recording mechanism and with the lever at the delivery end of the platform and adapted to be actuated by the latter for setting the latter in readiness to record weight as all except the front wheel of the car pass over said lever, mechanism associated with the recording mechanism and with the other of said levers, and adapted to be actuated by the latter for locking said recording mechanism in said set position as all except the rearmost wheel of the car passes over said lever, and adapted to release said mechanism to effect a weight-recording operation as the last wheel of the car passes over said lever, said recording mechanism adapted to be then released as the front wheel of the car actuates said lever at the delivery end of the platform, the lever at the receiving end of the latter adapted to effect locking of the recording mechanism against action in the event that said lever is again actuated before the front wheel of the car has actuated the other of said levers, and a timing device associated with said locking mechanism and said recording mechanism and controlled by the former for locking the latter against actuation during a predetermined period whereby to control the recording of weight of a car by the time elapsing between the last actuation of the lever at the entry end of the platform and the next actuation of the other lever.

20. In a weighing scale of the kind specified equipped with recording mechanism, means for automatically preventing recording of the weight of a car in the event of the presence of any part of another car on the platform simultaneously with the car to be weighed including a track lever adapted to be actuated successively by all of the wheels at one side of the car to be weighed as the latter enters upon the scale platform, mechanism controlled by said lever and associated with the recording mechanism for controlling the operation of the latter, said mechanism adapted to be positioned to permit operation of said recording mechanism as the last of said wheels actuates said lever, a second track lever at the other end of the platform, mechanism controlled thereby and associated with the recording mechanism for locking the same against operation, and adapted to release said recording mechanism as the first of said wheels actuates said second lever before said first lever is again actuated as by the entry of another car on the scale platform whereby said first-named mechanism is set to relock the recording mechanism against operation, and timing means associated with said recording mechanism for controlling the operation thereof independently of said levers.

21. In a weighing scale of the kind specified, the combination with track-levers adapted to be actuated successively by the wheels of the moving vehicle to be weighed as the latter passes over the scale platform, and recording mechanism, of means operatively connecting the latter with said track levers including a pair of bell-crank levers, stops for limiting the pivotal movement thereof to a predetermined arc, springs interposed between said levers and the track-levers tending to maintain the former at one limit of their movement, a reciprocable carriage connected with said bell-crank levers, springs interposed in said connection tending to maintain the said levers at the other limit of their movement, a pair of bell-crank levers pivotally mounted on said carriage, rods connecting the same with said first-named bell-crank levers, and means for manually reciprocating said carriage for varying the tension of said last-named springs whereby to throw said first-named bell-crank levers into and out of motion transmitting relation between the track-levers and said bell-crank levers on said carriage.

22. In a weighing scale of the kind specified, the combination with track-levers adapted to be actuated successively by the wheels of the moving vehicle to be weighed and recording mechanism, of means operatively connecting the latter with said track levers including a pair of bell-crank levers, stops for limiting the pivotal movement thereof to a predetermined arc, springs interposed between said levers and the track-levers tending to maintain the former at one limit of their movement, a reciprocable carriage connected with said bell-crank levers, springs interposed in said connection tending to maintain the said levers at the other limit of their movement, motion transmitting means on said carriage associated with the recording mechanism for controlling the latter, connection between the said means and said bell-crank levers for transmitting the movement of the latter thereto without lost motion when said carriage is in one position, and means for manually reciprocating said carriage for varying the tension of said last-named springs whereby to throw said bell-crank levers into and out of motion-transmitting relation to said means on said carriage.

23. In a weighing scale of the kind specified, equipped with recording mechanism including a reciprocable plunger, and means adapted to be actuated by the moving load to be weighed for controlling the movements of said plunger, of a time lock associated with said plunger and said mechanism and including a spring retracted member adapted to engage the said plunger to lock the same against reciprocation and adapted to be held in said position and released by said means at respectively different intervals, a rack-bar associated with said member, and a train of gears adapted to be actuated by said rack-bar for retarding the movement of said member by its retracting spring.

24. In a weighing scale of the kind specified, equipped with weight-recording mechanism including a scale-beam associated with the latter for accurately setting the same, a carriage supporting said scale beam, a yoke connecting the latter with the scale-platform, mechanism for raising and lowering said carriage, and mechanism for raising and lowering said yoke, and manually operable means common to both said mechanisms whereby to disconnect the scale-beam from the scale-platform.

25. In a weighing scale of the kind specified, equipped with weight-recording mechanism including a scale-beam associated with the latter for accurately setting the same, a carriage supporting said scale-beam, a yoke connecting the latter with the scale-platform, a second scale-beam, a walking-beam connected at one end with the latter and equipped between its ends with means for engaging said yoke, and manually operable means for raising and lowering said carriage for throwing the yoke into and out of engagement with said walking beam, whereby the load on the scale platform may be shifted from one to the other of said scale-beams.

26. In a weighing scale of the kind specified, equipped with weight-recording mechanism including a scale-beam associated with the latter for accurately setting the same, a carriage supporting said scale-beam, a yoke connecting the latter with the scale-platform, a second scale-beam, a walking-beam connected at one end with the latter and equipped between its ends with means for engaging said yoke, manually operable means associated with the other end of said walking beam for throwing the latter into and out of engagement with said yoke, and manually operable means for raising and lowering said carriage for throwing the yoke into and out of engagement with said first-named scale-beam whereby the load on the scale platform may be shifted from one to the other of said scale-beams.

27. In an automatic recording scale of the kind specified, recording mechanism including a spring-actuated printing plunger, a lever engaged therewith for supporting the same against the action of said spring, a cam at one end of said lever, a rotatable cam coacting therewith for alternately moving said lever to raise said plunger and tripping the same, latching means for holding said lever to support said plunger independently of said rotatable cam, a track-lever on the scale platform associated with said rotatable cam for actuating the same as the wheels of a car to be weighed pass thereover, whereby to position said cam to release said lever as the last wheel of the car to be weighed passes over said track-lever, and a second track-lever associated with said latching means for releasing the latter as the first wheel of said car actuates the said second track-lever.

28. In an automatic recording scale of the kind specified, recording mechanism including a spring-actuated printing plunger, a lever engaged therewith for supporting the same against the action of said spring, a cam at one end of said lever, a rotatable cam coacting therewith for alternately moving said lever to raise said plunger and tripping the same, latching means for holding said lever to support said plunger independently of said rotatable cam, a track-lever on the scale platform associated with said rotatable cam for actuating the same as the wheels of a car to be weighed pass thereover, whereby to position said cam to release said lever as the last wheel of the car to be weighed passes over said track-lever, a second track lever spaced from the first a distance exceeding the length of the car and associated with said latching means for releasing the latter as the first wheel of said car actuates the said second track-lever, and a time lock associated with said plunger and said latching means for preventing depression of said plunger before a given lapse of time after the last wheel of the car has passed over the first-named track-lever, said latching means adapted to interengage as the second wheel of the car passes over the second track-lever to prevent movement of said plunger if released by said time lock after said second car-wheel has actuated said second lever.

29. In an automatic recording scale of the kind specified, recording mechanism including a spring-actuated printing plunger, a lever engaged therewith for supporting the same against the action of said spring, a cam at one end of said lever, a rotatable cam coacting therewith for alternately moving said lever to raise said plunger and tripping the same, latching means for holding said lever to support said plunger independently of said rotatable cam, a track-lever on the scale platform associated with said rotatable cam for moving the same through a given arc as each wheel of the car passes successively over said track-lever whereby said cam first moves said lever to raise said plunger and then moves out of its path, a spring-held stop associated with said rotatable cam adapted to be actuated by a part of said lever against the action of said spring as said rotatable cam attains the last-named position and adapted to be released to move into the path of another part of said lever as said track-lever is again actuated and a second track-lever is again actuated, and a second track-lever spaced from the first a distance exceeding the car length and associated with said latching means for releasing the latter as the first wheel of said car actuates the said second track-lever, said stop adapted to move into the path of said plunger-supporting lever to prevent movement of said plunger as said first track-lever is actuated by the wheel of a second car before the first wheel of the first-named car has actuated said second track-lever.

30. In a scale of the kind specified, equipped with weight-recording mechanism, and controlling mechanism therefor adapted to be actuated by the wheels of the car to be weighed, said controlling mechanism including means for setting said recording mechanism in position preparatory to operation thereof and then releasing the same, and auxiliary timing means acting independently of but started by said controlling mechanism for controlling the operation of said recording mechanism independently of the latter.

31. In a scale of the kind specified equipped with recording mechanism, a pair of levers disposed at opposite ends of the scale platform and adapted to be successively actuated by the vehicle to be weighed as the latter enters upon and leaves the scale platform respectively, mechanism associated with said levers for first setting and subsequently releasing said recording mechanism to record the weight of the vehicle on the scale platform, said mechanism including means controlling the operation of said recording mechanism independently of the actuation of said levers.

32. In a scale of the kind specified equipped with recording mechanism, a pair of levers disposed at opposite ends of the scale platform and each adapted to be successively actuated at different intervals a number of times corresponding to the number of wheels of the vehicle to be weighed, mechanism associated with said levers and said recording mechanism for controlling the latter to set and release the same as each of said levers is successively actuated at different intervals by the said wheels and whereby the release of said recording mechanism is defeated in the event that one of said levers is actuated more or less than a given number of times corresponding to the number of wheels at one side of said vehicle.

In testimony whereof I have signed my name in presence of two subscribing witnesses.

GULDBRAND GULDBRANDSEN.

Witnesses:
 M. M. BOYLE,
 C. W. KINCH.